(Model.)
J. W. BURKHOLDER.
Hand Drill.
No. 234,109.  Patented Nov. 2, 1880.
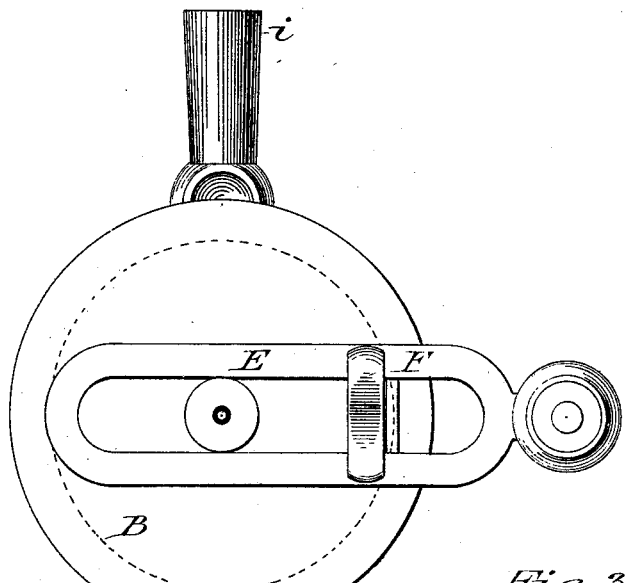
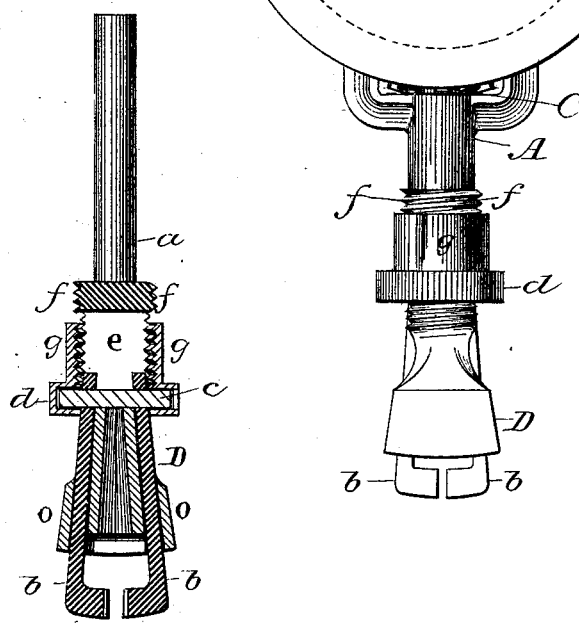
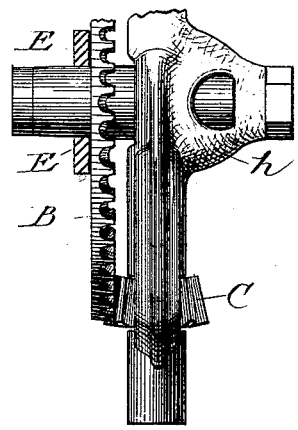
Witnesses:
C. F. Barker,
A. B. McKeever.
Inventor:
John W. Burkholder,
by E. N. Glennon,
Atty.

UNITED STATES PATENT OFFICE.

JOHN W. BURKHOLDER, OF MOLINE, ILLINOIS.

HAND-DRILL.

SPECIFICATION forming part of Letters Patent No. 234,109, dated November 2, 1880.

Application filed May 14, 1880. (Model.)

*To all whom it may concern:*

Be it known that I, JOHN W. BURKHOLDER, of Moline, county of Rock Island, and State of Illinois, have invented certain Improvements in Hand Drills and Chucks, of which the following is a specification.

My invention relates to an improvement in hand drilling-machines; and it consists in the construction and arrangement of parts whereby the drill is held while in use, as will be more fully described hereinafter.

Figure 1 is a side elevation of a drill complete. Fig. 2 is a vertical section of the chuck. Fig. 3 is an edge view of a portion of the drill.
A represents the drill-stock; B, the driving-wheel; C, the pinion, which meshes with the wheel B and operates the drill, and D the chuck.

The wheel B is operated by the slotted adjustable crank or handle E, which is held in any desired position by means of the clamping-screw F. The stock A has a socket, $i$, made in its upper end to receive a rest, and has an extension, $h$, formed on one side, so as to form a longer and better bearing for the journal of the wheel B. The rod or shaft $a$ passes up through the lower end of the stock, and has the pinion secured to its upper end. The lower end of this rod or shaft is considerably enlarged, as shown at $f$, and provided with a screw-thread, so as to screw into the internally-threaded collar $g$, by which the jaws $b$ are opened and closed. Through this enlarged end $f$ is made a slot, $e$, to accommodate the jaws $b$ and pin $c$, which connects the jaws to the collar $g$. In order that this collar $g$ may be turned freely around without affecting the pin $c$ an enlargement, $d$, is formed on the lower end of the collar, and into this enlargement the ends of the pin pass after they have passed through the upper ends of the jaws $b$. The upper ends of the jaws are passed upward through the guides $o$ at a suitable angle, which guides form a bearing, inside and out, for the jaws, and thus always hold them firmly and rigidly in place. As the collar $g$ is moved upward on the part $f$ the jaws are drawn upward through the guides, and the lower ends of the jaws are brought nearer together; but when the sleeve or collar is moved downward on the part $f$ the clamping ends of the jaws are opened outward.

Having thus described my invention, I claim—

In a drill, the combination of the rod $a$, having the enlarged threaded part $f$, which has the slot $e$ made through its center, and the guides $o$ at the end, and sleeve $g$, having the enlarged grooved part $d$, the pin $c$, and jaws $b$, substantially as shown.

JOHN W. BURKHOLDER.

Witnesses:
C. F. BARKER,
E. B. McKEEVER.